United States Patent
Guim Bernat et al.

(10) Patent No.: US 10,372,362 B2
(45) Date of Patent: Aug. 6, 2019

(54) DYNAMICALLY COMPOSABLE COMPUTING SYSTEM, A DATA CENTER, AND METHOD FOR DYNAMICALLY COMPOSING A COMPUTING SYSTEM

(71) Applicant: Intel Corporation, Santa Clara, CA (US)

(72) Inventors: Francesc Guim Bernat, Barcelona (ES); Karthik Kumar, Chandler, AZ (US); John Chun Kwok Leung, Folsom, CA (US); Mark Schmisseur, Phoenix, AZ (US); Thomas Willhalm, Sandhausen (DE)

(73) Assignee: Intel Corporation, Santa Clara, CA (US)

( * ) Notice: Subject to any disclaimer, the term of this patent is extended or adjusted under 35 U.S.C. 154(b) by 155 days.

(21) Appl. No.: 15/474,005

(22) Filed: Mar. 30, 2017

(65) Prior Publication Data

US 2018/0285009 A1 Oct. 4, 2018

(51) Int. Cl.
*G06F 3/06* (2006.01)
*G06F 9/50* (2006.01)

(52) U.S. Cl.
CPC .......... *G06F 3/0631* (2013.01); *G06F 3/0604* (2013.01); *G06F 3/0673* (2013.01); *G06F 9/5044* (2013.01); *G06F 9/5061* (2013.01)

(58) Field of Classification Search
CPC ..... G06F 3/0604; G06F 3/0631; G06F 3/0673
See application file for complete search history.

(56) References Cited

U.S. PATENT DOCUMENTS

2007/0250630 A1* 10/2007 Blanding ............... G06F 9/00
                                                                 709/226
2014/0136710 A1   5/2014 Benari et al.

FOREIGN PATENT DOCUMENTS

WO    2011162744 A1    12/2011
WO    2014052843 A1    4/2014

* cited by examiner

*Primary Examiner* — Aracelis Ruiz
(74) *Attorney, Agent, or Firm* — 2SPL Patent Attorneys PartG mbB

(57) ABSTRACT

The present disclosure relates to a dynamically composable computing system comprising a computing fabric with a plurality of different disaggregated computing hardware resources having respective hardware characteristics. A resource manager has access to the respective hardware characteristics of the different disaggregated computing hardware resources and is configured to assemble a composite computing node by selecting one or more disaggregated computing hardware resources with respective hardware characteristics meeting requirements of an application to be executed on the composite computing node. An orchestrator is configured to schedule the application using the assembled composite computing node.

24 Claims, 10 Drawing Sheets

DYNAMICALLY COMPOSABLE COMPUTING SYSTEM, A DATA CENTER, AND METHOD FOR DYNAMICALLY COMPOSING A COMPUTING SYSTEM

FIELD

The present disclosure generally relates to configurable or composable computing resources.

BACKGROUND

Software Defined Infrastructure (SDI) is a technological advancement that enables new ways to operate a shared pool of configurable computing resources deployed for use in a data center or as part of a cloud infrastructure. SDI may allow individual elements of a system of configurable computing resources to be composed with software. These elements may include disaggregate physical elements (hardware) such as CPUs, memory, network input/output devices or storage devises. The elements may also include composed elements that may include various quantities or combinations of physical elements composed to form logical servers that may then support virtual elements arranged to implement service/workload elements.

The virtual elements of the SDI can be ordered to form a service chain. In general, each virtual element of the service chain will have differing performance limitations. As a result, a virtual element can become a bottleneck in the overall performance of the service chain.

BRIEF DESCRIPTION OF THE DRAWINGS

Some examples of apparatuses and/or methods will be described in the following by way of example only, and with reference to the accompanying figures, in which FIG. 1A and FIG. 1B combine to form FIG. 1 illustrating an example first system.

DESCRIPTION OF EMBODIMENTS

Figures 1, 1A:
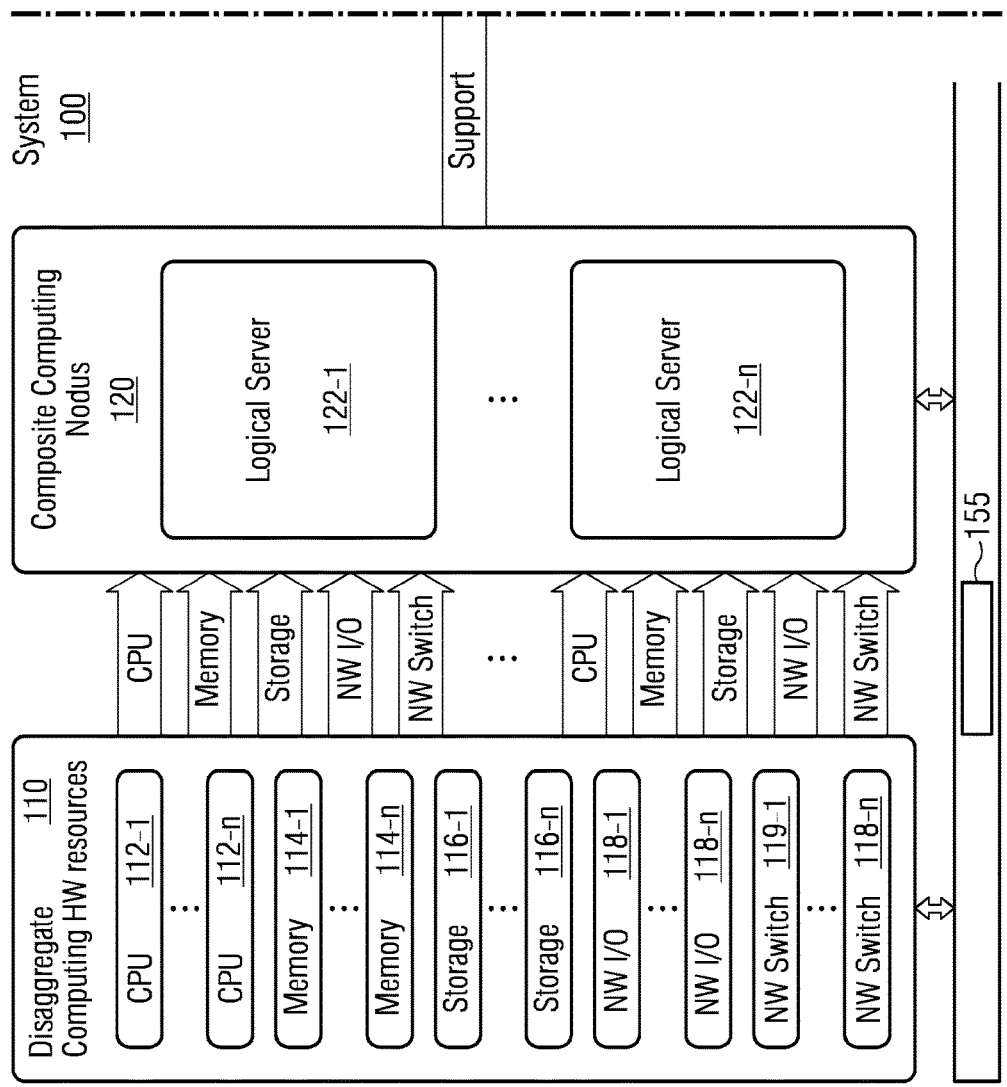
Figure 1B:
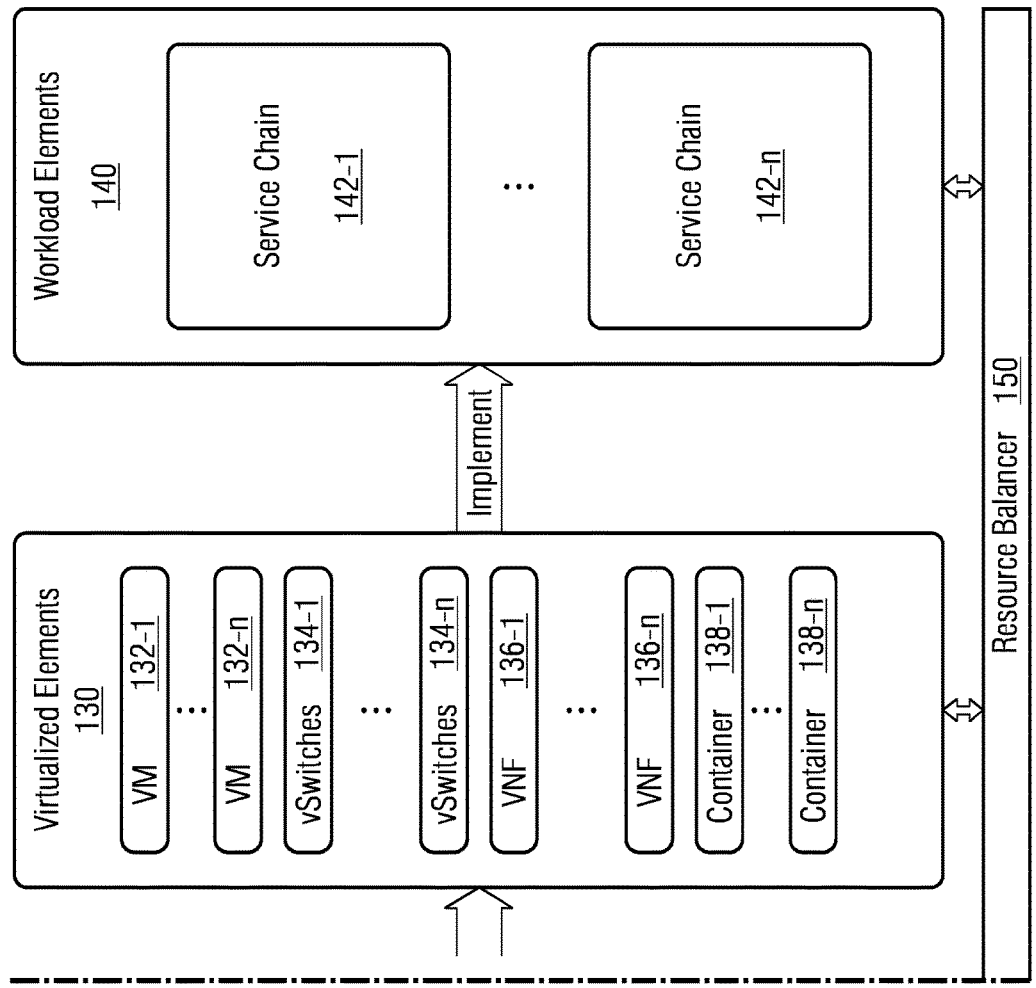

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Over the last decade, huge growth in demand for Internet and mobile services has driven rapid transformation in digital businesses. This growth has been highly disruptive; it has created new business opportunities, and challenged the status quo. In data centers, two forces have created much of this change: the evolution of virtualization and the rise of cloud computing. However, these forces represent only two of the three key elements that will drive competitive advantage going forward. The third element and missing piece is a flexible computing, storage, and network fabric that will usher in an age of truly agile digital infrastructure. Virtualization has set the stage for agile infrastructure. It has enabled elastic horizontal scaling, planted the seeds for cloud computing, and created new standard units of computing, such as virtual machines, which could be installed on one server or span many. The growth in virtualization has been complemented by the expansion of various flavors of cloud computing infrastructure services: Infrastructure as a Service, Platform as a Service, and the most prevalent form, Software as a Service. By creating the potential for massive scalability, cloud computing has created new business models and changed the context for existing ones. Businesses are counting on the cloud not simply for lower total cost of ownership, but also greater return on investment, as they increasingly try to use the flexibility of the cloud for business advantage reaching their users anywhere in the world and accelerating their ability to evolve to meet customer needs.

However, today's infrastructure does not effectively deal with the complexity of managing increasingly large numbers of computing resources that might reside anywhere in the world, nor does it help address the need for rapid change and the introduction of new product features and capabilities.

This brings the need of adding software abstraction layers on top in order to scale and adapt the architecture to the needs of the moment. Traditional data center architectures include set of different heterogeneous or homogenous platforms (also referenced as compute nodes or servers) that are statically composed by a set of local resources (such as compute, memory, storage, computing fabric or accelerators) and may have access to disaggregated resources (such as storage or accelerators) over the computing fabric. One of the main advantages that these architectures provide is the ease of maintenance and manageability. However, they lack of adaptability, configurability and extensibility. As has been already mentioned, most of data centers requirements and workloads evolved during the last decades having a much larger variety of needs, characteristics and dynamicity. To satisfy these new requirements facilitate SDI architectures provide mechanism that allow to create dynamically the platform where applications are executed.

As contemplated in the present disclosure, various workloads can be executed using a shared pool of configurable resources, such as, computing hardware resources of a data center. These workloads can be implemented using Software-Defined Infrastructure (SDI), Software Defined Network (SDN), or other virtualization techniques. In general, the present disclosure provides processes and apparatuses to manage computing hardware resource allocation for these various workloads. For example, the present disclosure provides a controller configured to allocate computing hardware resources having respective hardware characteristics that meet predefined (hardware) requirements of a workload to be executed on an assembled composite computing node. Examples of the present disclosure may allocate cache space (e.g., L3 cache, or the like), memory bandwidth, and/or input and output (I/O) bandwidth to various workloads. In some examples, the controller may allocate such resources based on performance requirements and/or relative priority of the workloads. Such performance goals and/or workload priority can be specified, for example, by a service level agreement (SLA), or the like.

Examples of the present disclosure provide management and allocation of shared computing resources at a "fine-grained" level as compared to present techniques. As such, examples of the present disclosure may enable higher consolidation density of workloads, better management of resources to meet performance goals, and better management on a per workload (e.g., process flow, Virtual Machine (VM), Virtual Network Function (VNF), container, etc.) basis. In particular, the present disclosure provides management or resource allocation on a per workload basis as opposed to limiting the number of workloads per platform, or limiting resource usage per workload.

In some examples, a controller can be configured to allocate resources, adjust a resource allocation, rebalance resource allocations, and/or migrate service chains to another server or portion of configurable computing resources. The controller may be configured to receive a policy to include indications of hardware requirements for a number of service chains. The controller may also be configured to receive performance information to include indications of the performance of the service chains and to adjust resource allocation based on the received policy, hardware requirements, and the relative priority between the service chains.

FIG. 1 illustrates an example first dynamically composable computing system 100. The computer system 100 and associated components may be housed in a data center.

In some examples, system 100 can include a plurality of different disaggregated computing hardware resources 110, composite computing nodes 120, virtualized elements 130, workload elements 140, and a resource balancer or manager 150. Here, disaggregated computing hardware resources may be also understood as separated or distributed computing hardware resources, which may be located in different rack drawers or racks, respectively. Each of the disaggregate computing hardware resources 110 has associated therewith respective hardware characteristics, such as processing performance (e.g. clock rate), power consumption, bandwidth (e.g. memory and/or storage bandwidth), latency, capacity (e.g. memory and/or storage capacity), underlying technology (e.g., volatile vs. non-volatile memory, DRAM vs., 3-dimentional (3D) cross-point memory vs. storage, NAND storage vs. Hard Disk storage, etc.), and cost, for example. Resource manager 150 has access to information on the respective hardware characteristics of the different disaggregated computing hardware resources 110 and is configured to assemble a composite computing node 120 by selecting or allocating one or more disaggregated computing hardware resources 110 with respective hardware characteristics that meet requirements of an application (e.g., a service chain 142) to be executed on the assembled composite computing node 120. Once all the disaggregate computing hardware resources 110 are assembled creating the composite node 120 or the virtualized element 130, an Operating System (OS) can be booted and the service chain or application 140 can be instantiated.

According to examples of the present disclosure, the resource manager 150 may include data structures 155 to store hardware characteristics of individual disaggregate computing hardware resources 110, such as performance, capacity, technology characteristics and cost for each of the different disaggregate computing hardware resources 110. For example, the resource manager 150 may include data structures 155 which may be configured to store metadata indicative of the hardware characteristics associated with the plurality of different distributed disaggregated hardware resources 110. The resource manager 150 can also provide mechanisms that can be used by the disaggregate computing hardware resources 110 to register their respective hardware characteristics, such as performance, capacity and technology characteristics, with the resource manager 150, for example at data center boot time. For example, upon adding a new hardware resource to a pool of disaggregate hardware resources, the newly added hardware resource could send a register request message including information on its hardware characteristics to the resource manager 150. The newly added hardware resource together with its hardware characteristics information can then be registered or stored in the resource manager 150. Instead of this automated procedure, also a human system administrator could enter hardware characteristics information of newly added hardware into the resource manager 150. In this way, the resource manager 150 can expose new resource selection policies to an orchestrator scheduling service chains or applications that allows specifying requirements for computing hardware resources associated to a composite computing node 120.

According to some examples, as shown in FIG. 1, disaggregate computing hardware resources 110 may include CPUs 112-1 to 112-$n$, where "n" is any positive integer greater than 1. CPUs 112-1 to 112-$n$ may individually represent single microprocessors or may represent separate cores of a multi-core microprocessor. Disaggregate computing hardware resources 110 may also include memory 114-1 to 114-$n$. Memory 114-1 to 114-$n$ may represent various types of memory devices such as, but not limited to, Dynamic Random Access Memory (DRAM) devices that may be included in Dual In-Line Memory Modules (DIMMs) or other configurations that may also include types non-volatile memory such as, but not limited to, non-volatile memory such as 3D cross-point memory that uses chalcogenide phase change material (e.g., chalcogenide glass). The skilled person having benefit from the present disclosure will appreciate that the term memory refers to components that allow for short-term data access (volatile memory). Disaggregate computing hardware resources 110 may also include storage 116-1 to 116-$n$. Storage 116-1 to 116-$n$ may represent various types of storage devices such as Hard Disk Drives (HDDs) or Solid State Drives (SSDs). The skilled person having benefit from the present disclosure will appreciate that the term storage refers to components that allow for long-term data access (non-volatile storage). Disaggregate computing hardware resources 110 may also include so-called compute sleds including a configuration of local computing hardware resources such as a set of CPUs and an amount of computer memory. In some example, a compute sled may include a static predetermined configuration of local computing hardware resources such as a fixed set of CPUs and a fixed amount of memory. Disaggregate computing hardware resources 110 may also include network (NW) input/outputs (I/Os) 118-1 to 118-$n$. NW I/Os 118-1 to 118-$n$ may include network interface cards (NICs) having one or more NW ports w/associated media access control (MAC) functionality for network connections within system 100 or external to system 100. Disaggregate computing hardware resources 110 may also include NW switches 119-1 to 119-$n$. NW switches 119-1 to 119-$n$ may be capable of routing data via either internal or external network links for elements of system 100.

In some examples, as shown in FIG. 1, composite computing nodes 120 may include one or more logical servers 122-1 to 122-$n$. Said differently, a logical server 122 may be considered as a composite computing node assembled or composed from disaggregate computing hardware resources 110. As mentioned before, a logical server 122 may be composed in accordance with (hardware) requirements of one or more applications (e.g., service chains 142) to be executed on the logical server 122. For these examples, groupings of CPU, memory, storage, NW I/O or NW switch elements from disaggregate computing hardware resources 110 may be composed to form logical servers 122-1 to 122-$n$. Each logical server 122-1 to 122-$n$ may include any number or combination of CPU, memory, storage, NW I/O or NW switch elements. Differently from conventional mechanisms, disaggregate computing hardware resources 110 forming a composite computing node 120 are exposed as local resources to a software stack or an application running on the composite node. Thereby, despite they can be distributed across the data center in multiple hardware resource pools the proposed SDI architecture provides the illusion that applications are executed in a traditional platform with the exact requirements that application/user provided. Once the application finishes its execution the composite node can be decomposed.

According to some examples, as shown in FIG. 1, virtualized elements 130 may include a number of Virtual Machines (VMs) 132-1 to 132-$n$, virtual switches (vSwitches) 134-1 to 134-$n$, Virtual Network Functions (VNFs) 136-1 to 136-$n$, or containers 138-1 to 138-$n$. It is to be appreciated, that the virtual elements 130 can be configured to implement a variety of different functions and/or execute a variety of different applications. For example, the VMs 132-$a$ can be any of a variety of virtual machines configured to operate or behave as a particular machine and may execute an individual operating system as part of the VM. The VNFs 136-$a$ can be any of a variety of network functions, such as, packet inspection, intrusion detection, accelerators, or the like. The containers 138-$a$ can be configured to execute or conduct a variety of applications or operations, such as, for example, email processing, web servicing, application processing, data processing, or the like.

In some examples, virtualized elements 130 may be arranged to form service chains 142, also referred to as workloads, process flows or applications. For example, service chains 142-1 and 142-2 may include VNFs 136-1 to 136-3 and 136-4 to 136-6, respectively. Additionally, the individual virtual elements of a service chain can be connected by vSwitches 134. Furthermore, in some examples, each of the virtualized elements 130 for any number of service chains 142 may be supported by a given logical server from among logical servers 122-1 to 122-$n$ of composite computing nodes 120. For example, logical server 122-1 can be formed from disaggregate physical elements such as CPU 112-1 having cache, memory 114-1, and NW I/O 118-1. Accordingly, each of the service chains supported by the logical server 122-1 can be configured to operate using a portion of the computing resources (e.g., CPU 112-1, memory 114-1, NW I/O 118-1, etc.) of the logical server 122-1. Said differently, a portion of the computing resources of the logical server 122-1 can be allocated for each of the service chains 142 supported by the logical server 122-1. According to examples of the present disclosure, the disaggregated computing hardware resources 110 are allocated to a logical server 122 based on respective hardware requirements of a service chain 142 to be executed by said logical server 122. For this purpose, the resource manager 150 has stored information on hardware characteristics of the individual disaggregated computing hardware resources 110.

In some examples, the resource manager 150 may be arranged to manage or control at least some aspects of the disaggregate computing hardware resources 110, composite computing nodes 120, virtualized elements 130 and service chains 140. Resource balancer or manager 150, which may also be referred to as SDI-Manager, can be implemented by software, hardware, or some combination of the two. In some examples, it can be a hardware component of a data center. As such, it can comprise computer hardware components, such as CPUs, memory devices, storage devices, I/O devices, display devices, etc. In some examples, the resource manager 150 is configured as a programmable hardware device, such as a Digital Signal Processor (DSP) or Field Programmable Gate Array (FPGA). The resource manager 150 can provide for the sharing of the disaggregate computing hardware resources 110 and composite computing nodes 120 by the virtualized elements 130 and the service chains 140 based on a relative priority of the virtualized elements 130 and service chains 140. For example, the resource manager 150 may be configured to coordinate the sharing of hardware resources in the system 100 (e.g., cache space, memory bandwidth, I/O bandwidth, or the like) between various ones of the virtualized elements 130 and/or service chains 140 based on the relative priority of these elements.

The resource manager 150 can be configured to coordinate the sharing of resources among any workload supported by the pool of configurable resources represented by the system 100. For example, the resource manager 150 can coordinate the sharing of resources between the virtualized elements 130, the service chains 140, or any combination of these "workload elements." Although many examples presented herein use the service chains 140, and particularly Network Virtualized Functions (NVFs) as examples, this is not to be limiting.

The resource manager 150 can be configured to receive workload requirements for the workload elements 140 supported by the system 100 and coordinate the sharing of hardware resources between workload elements 140 based on these workload requirements. The workload requirements can be provided by an orchestrator aligning a business request with the applications, data, and infrastructure. The orchestrator defines the policies and service levels through automated workflows, provisioning, and change management. This creates an application-aligned infrastructure that can be scaled up or down based on the needs of each application. For example, the resource manager 150 can be configured to allocate (or adjust an allocation) of a portion of the shared pool of configurable resources (e.g., the disaggregate computing hardware resources 110) for any number of workload elements 140. Additionally, the resource manager 150 can be configured to relocate workload elements 140 from one logical server 122 to another if workload hardware requirements change.

The resource manager 150 can be configured to coordinate this sharing of resources based on workload requirements (e.g. hardware requirements) of workload elements 140 and, alternatively or additionally, an indication of the relative priority between workload elements 140. Examples of this are provided in greater detail below. However, it is worthy to note, that the resource manager 150 can further be configured to coordinate sharing based on increasing throughput, decreasing latency, or the like. As such, the coordination of resource sharing described herein can lead to an increase in data center performance and additionally can lead to an increase in density of workload elements 140 without sacrificing performance.

Figure 2A:
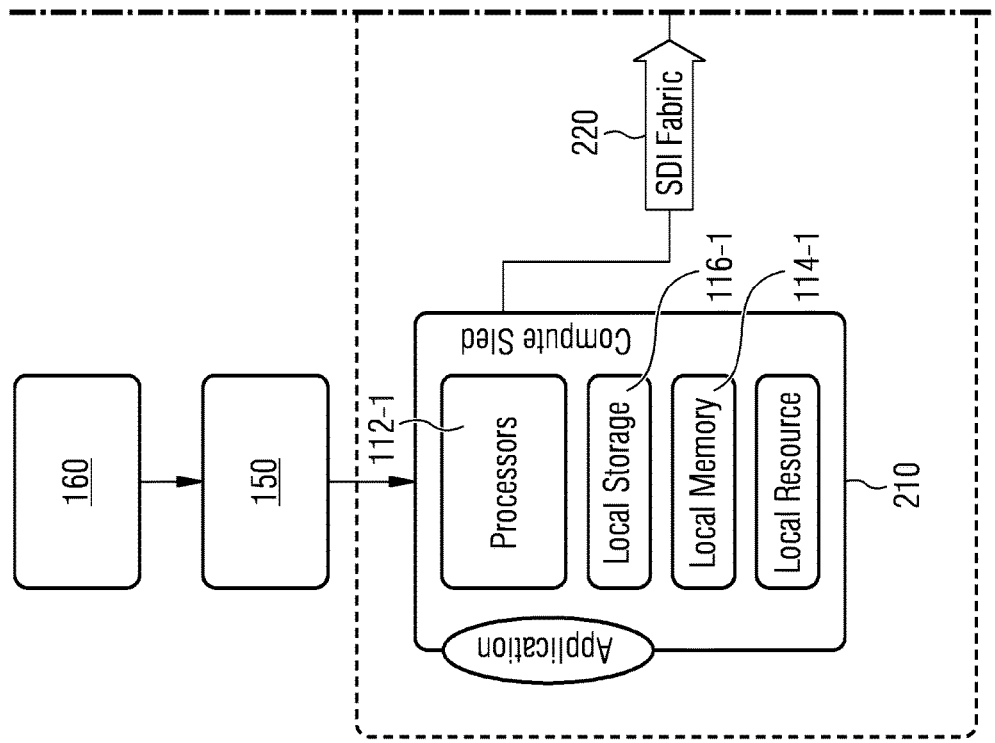
FIG. 2A and FIG. 2B combine to form FIG. 2 showing an example of assembling a composite node.
Figure 2B:
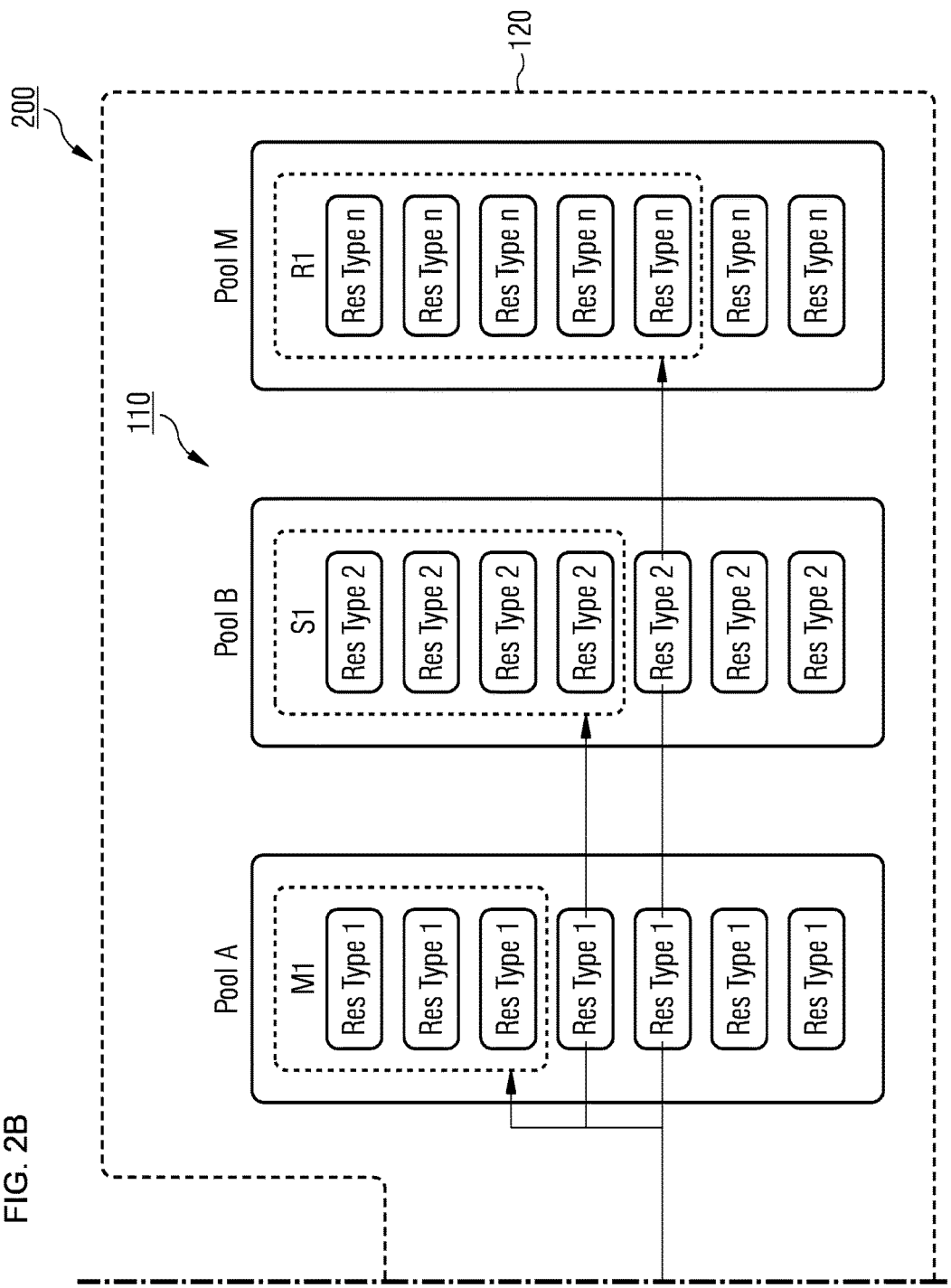

FIG. 2 shows an example of assembling a composite node 120 from disaggregate computing hardware resources 110 according to the present disclosure. In FIG. 2, the resource manager 150 is operably coupled to an orchestrator 160 configured to schedule the service chains or applications 142 running on the assembled composite computing node(s). In general, the orchestrator 160 is configured to implement policies and manage the overall system 200 and more particularly the cloud infrastructure in which the composite computing node (e.g., logical server 122) is implemented. The orchestrator 160 may include or be configured with information to include indications of policies and the relative priority or a priority class for each of the service chains 142-1 and 142-2. Such policies can correspond to Service Level Agreements (SLAs) or the like for the workload elements and/or customers of the system 200. Thus, the policies can include hardware requirements of one or more service chains or applications 142 to be executed on a composite computing node or logical server 122. In some examples, the orchestrator 160 is configured to provide the application's hardware requirements to the resource manager 150 for assembling a composite computing node for the application. As such, the orchestrator 160 can be considered as a scheduler for the service chains or applications 142. The information including the indications of the policy and priority can be communicated to the resource manager 150 in order to select or compose adequate logical servers 122 for the applications 142.

In the example of FIG. 2, the resource manager 150 creates an example composite node 120 by connecting a compute sled 210 comprising a certain amount of local CPUs 112-1, local memory 114-1 and local storage 116-1 to three units of disaggregated resource of type 1 provided by resource pool A, four units of resource type 2 provided by resource pool B and five units of resource type n provided by resource pool M. In the illustrated example, the different computing hardware resource pools comprise respective different types of disaggregated computer memory or storage. Further, the different computing hardware resource pools may be located in different rack drawers or in different racks of a data center, for example. The different disaggregated memory or storage hardware resources 110 can be connected to compute sled 210 via computing fabric 220.

In this particular example, it is assumed that local processors 112-1 are hosted in minimal platform form factors with some local resources named compute sled. Thus, in the illustrated example, the composite node 120 comprises at least one compute sled 210 including a (minimum) set of local computing hardware resources 112-1, 114-1, 116-1. The resource manager 150 is configured to connect the compute sled 210 to the selected disaggregated memory or storage hardware resources 110 through the computing fabric 220. The local computing hardware resources of the compute sled can comprise one or more local CPUs and one or more local memory modules. However, in another example the CPUs 112-1 could be pooled as well as part of another hardware resource pool.

Figures 3, 3A:
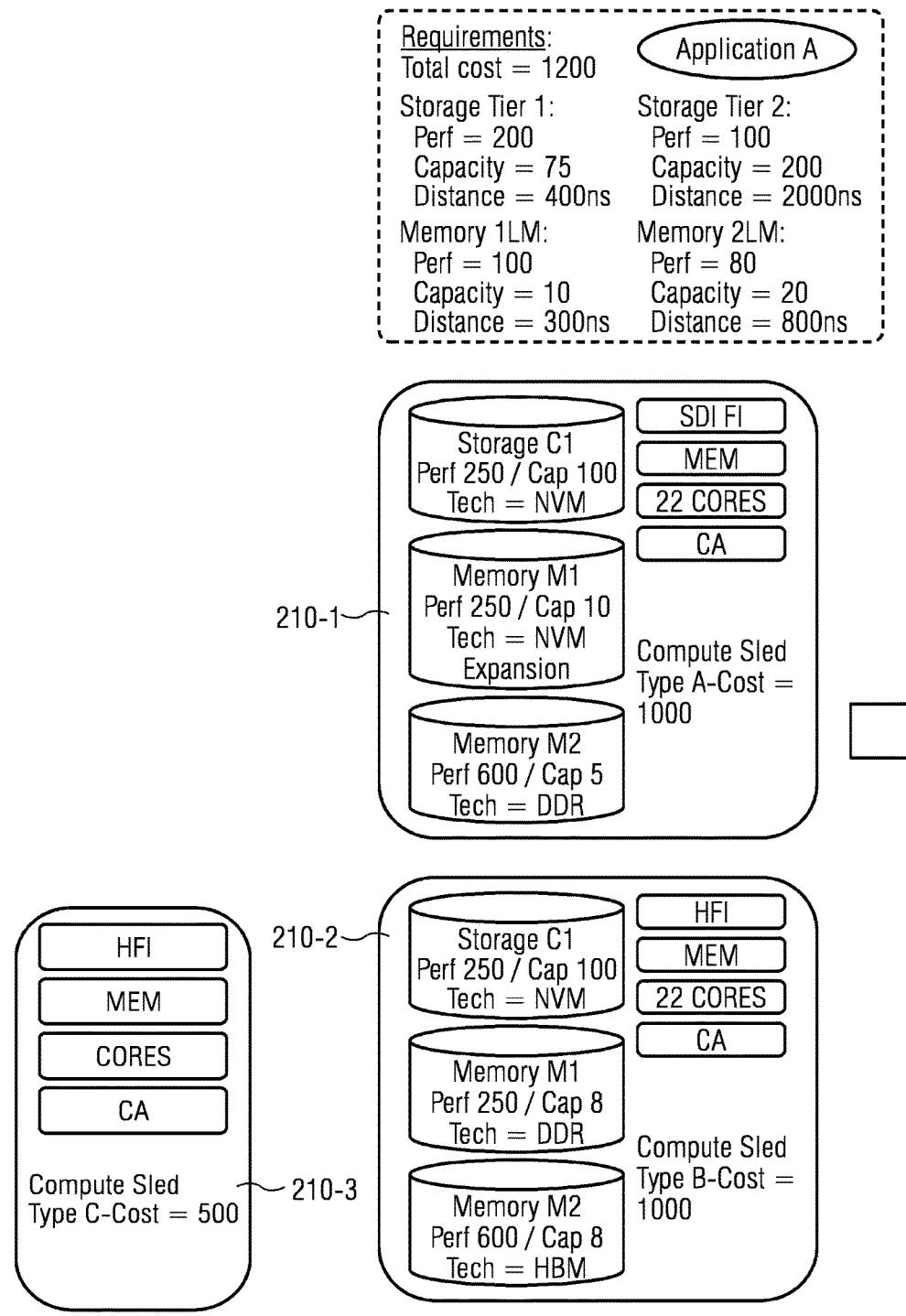
FIG. 3A and FIG. 3B combine to form FIG. 3 showing an example of assembling a composite node based on hardware requirements of an application.
Figure 3B:
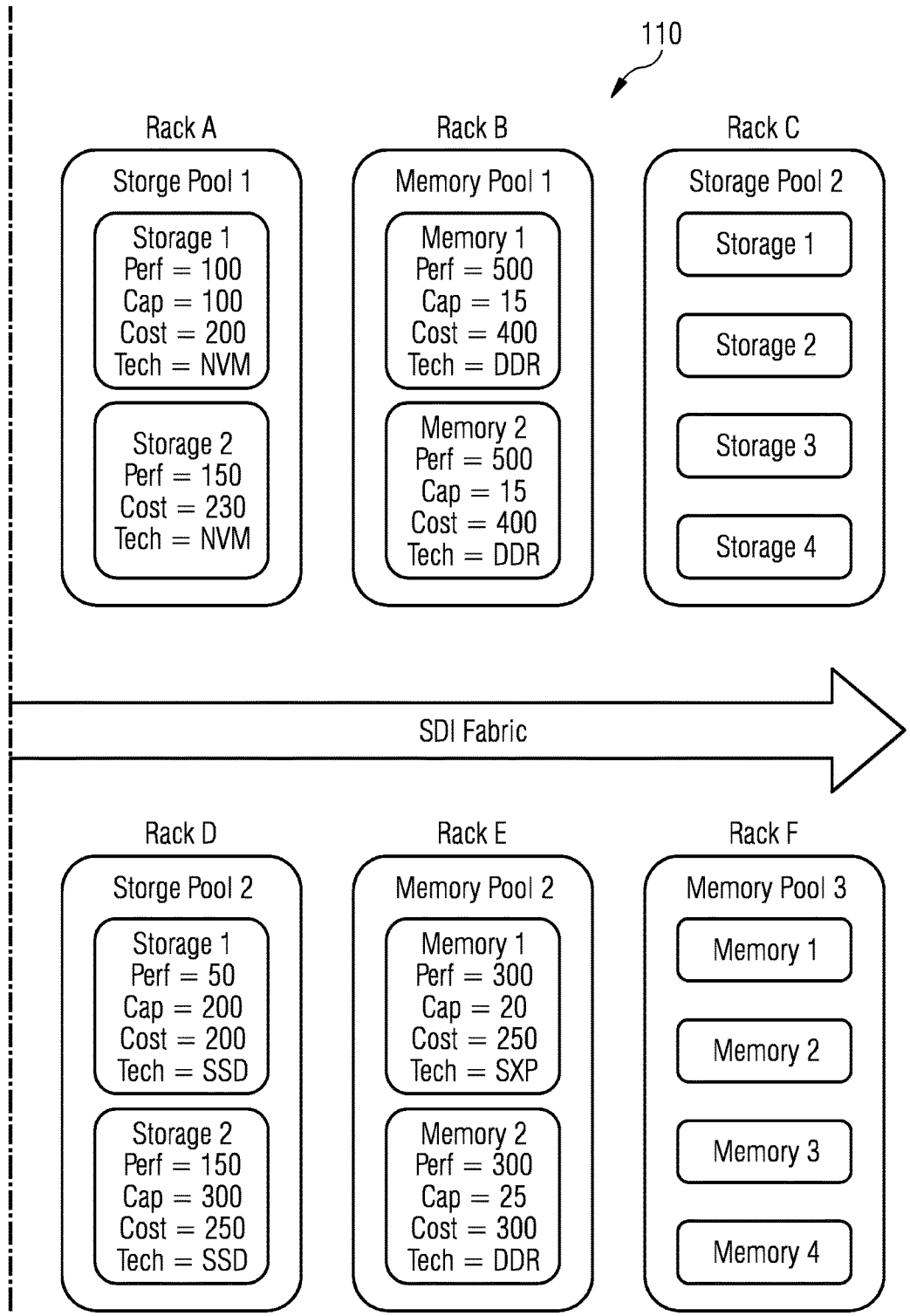

Another example of assembling one or more composite nodes 120 using disaggregate memory or storage hardware resources 110 according to predefined hardware requirements of an application A is shown in FIG. 3. The skilled person having benefit from the present disclosure will appreciate that the illustrated hardware attributes disaggregate memory or storage hardware resources 110 are only examples and could deviate in other implementations.

The orchestrator 160 can be configured to determine, according to an application's hardware requirements, a number of memory levels or storage tiers of the composite computing node to be assembled for the application. In the illustrated example of FIG. 3, there are two memory levels as well as two storage tiers for application A, which also requires a total hardware cost of no more than 1200 cost units. Examples for cost units are financial cost units (e.g. US dollars, Euros, etc.) or energy cost units (e.g., kWh). The different memory levels or storage tiers can be associated with respective different memory or storage hardware resource characteristics. Here, storage tier 1 is supposed to have a performance of 200 performance units, while storage tier 2 is supposed to have a lower performance of only 100 performance units.

Examples for performance units are Floating Point Operations Per Second (FLOPS), Instructions per second (IPS), response time, etc. Storage tier 1 is supposed to have a capacity of 75 capacity units, while storage tier 2 is supposed to have a higher capacity of 200 capacity units. Examples for capacity units are bits or bytes, words, etc. Storage tier 1 is supposed to have a distance from a CPU corresponding to a latency of 400 ns, while storage tier 2 is supposed to have a distance from a CPU corresponding to a higher latency of 2000 ns. Memory level 1 is supposed to have a performance of 100 performance units, while memory level 2 is supposed to have a lower performance of only 80 performance units. Memory level 1 is supposed to have a capacity of 10 capacity units, while memory level 2 is supposed to have a higher capacity of 20 capacity units. Memory level 1 is supposed to have a distance from CPU corresponding to a latency of 300 ns, while memory level 2 is supposed to have a distance from CPU corresponding to a higher latency of 800 ns.

The list of different memory levels and storage tiers requirements can be provided from the orchestrator 160 to the resource manager 150 in order to select appropriate memory or storage hardware resources for a corresponding composite node. For this purpose the resource manager 150 can be configured to associate one or more memory or storage hardware resources meeting the respective required hardware resource characteristic with a respective memory level or storage tier. For example, a first one of the specified memory or storage tiers (e.g. memory level 1 of application A in FIG. 3) can be associated with local memory or storage hardware resources of a compute sled and at least a second one of the of memory or storage tiers (e.g. memory level 2 of application A in FIG. 3) can be associated with dynamically configured disaggregated computing memory or storage hardware resources. Further, a respective memory/storage address range can be mapped to a respective memory level or storage tier.

Figure 4:
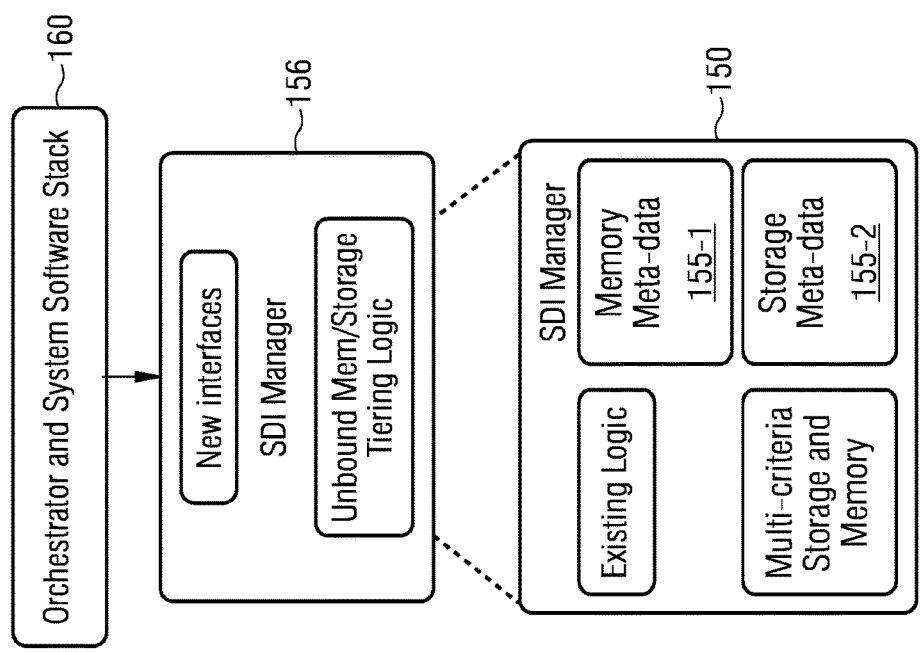
FIG. 4 shows a resource manager comprising storage to store metadata indicative of hardware characteristics associated with a plurality of different distributed disaggregated hardware resources.

FIG. 4 shows an example of a resource manager 150 having storage 155 for storing metadata indicative of the hardware characteristics associated with the plurality of different distributed disaggregated hardware resources. In the illustrated example, resource manager 150 comprises first storage 155-1 for storing metadata indicative of the hardware characteristics associated with a plurality of different disaggregated memory resources and second storage 155-2 for storing metadata indicative of the hardware characteristics associated with a plurality of different disaggregated storage resources. As can be seen, first storage 155-1 can comprise entries with respect to a pool ID, a resource ID, technology metadata (e.g., DRAM, 3D crosspoint memory, reliability, etc.), performance metadata (e.g., bandwidth, latency, etc.), and economical cost of disaggregate memory hardware resources. Similarly, second storage 155-2 can comprise entries with respect to a pool ID, a resource ID, technology metadata (e.g., NVM, reliability, etc.), performance metadata (e.g., bandwidth, latency, etc.), and economical cost of disaggregate storage hardware resources. Thus, first and second storage 155-1, 155-2 can be used to store data about the different disaggregated memory and storage resources available in the data center. These structures can hold technological and performance data as well as economical cost.

The resource manager 150 can also comprise a logic circuit 156 that implements a respective resource selection policy for memory and storage that, based on orchestrator requests, selects the different memory or storage hardware resources for each of the specified tiers. For example, the resource manager 150 may be configured to associate a memory or storage hardware resource with one of the specified memory or storage tiers only if its associated hardware resource characteristics fall within a predefined range for the respective memory or storage tier. For example, the resource manager 150 may be configured to associate a memory or storage hardware resource with one of the memory or storage tiers only if its associated processing performance (e.g., cache, speed, clock rate, etc.) falls within a predefined performance range for the respective tier. In the example, of FIG. 3, only memory that has a performance of at least 100 performance units should be associated with memory level 1. Additionally or alternatively, the resource manager 150 may be configured to associate a memory or storage hardware resource with one of the memory or storage tiers only if its underlying technology meets predefined technology requirements for the respective tier. Additionally or alternatively, the resource manager 150 may be configured to associate a memory or storage hardware resource with one of the memory or storage tiers only if its associated costs fall below a predefined cost level for the respective tier.

As has been discussed before, the resource manager 150 can include a resource selection policy that can be used to select memory and storage per each of the levels and tiers using the provided requirements. For example, given a set of different memory or storage levels $\{1, \ldots, N\}$ with a set of requirements iReq={[PerfLowThr, PerfHighThr], [LatLowThr,LatHighThr]}, TechReqi=[Tech1, ... ,TechN]} and a maximum cost MAX_COST or a MAX_COST_PER_LEVELi, the resource manager 150 can select the resource Resi (being resource memory or storage) referring to memory or storage level i that satisfies that Perf(Resi) is within [PerfLowThr, PerfHighThr], Lat(Resi) is within [LatLowThr,LatHighThr], technological requirements provided by the resource satisfy TechReqi and the associated cost is less or equal than MAX_COST/NumLevels or MAX_COST_PER_LEVELi (depending on how the resource is provided).

Additionally or alternatively, the selection of the hardware resource can also take into account other type of resource selection policies. For example, the resource manager 150 could also select hardware resources to reduce data center fragmentation with the unique restriction that they do not violate the actual restrictions specified for each of the memory and storage policies. The selection policies can assume that a cost associated with a local resource within a composite node (e.g., DDR or High Bandwidth Memory (HBM) within a compute sled) are computed by dividing the cost of that specific node by memory/storage levels that would be mapped from the compute sled into the composite node. The resource manager 150 can allocate SLA for disaggregated resources that share some part of the end to end path with other composite nodes. In this case, if there is any actual cost associated with the SLA for that particular resource, the cost would be added to the actual cost of that resource.

Figure 5:
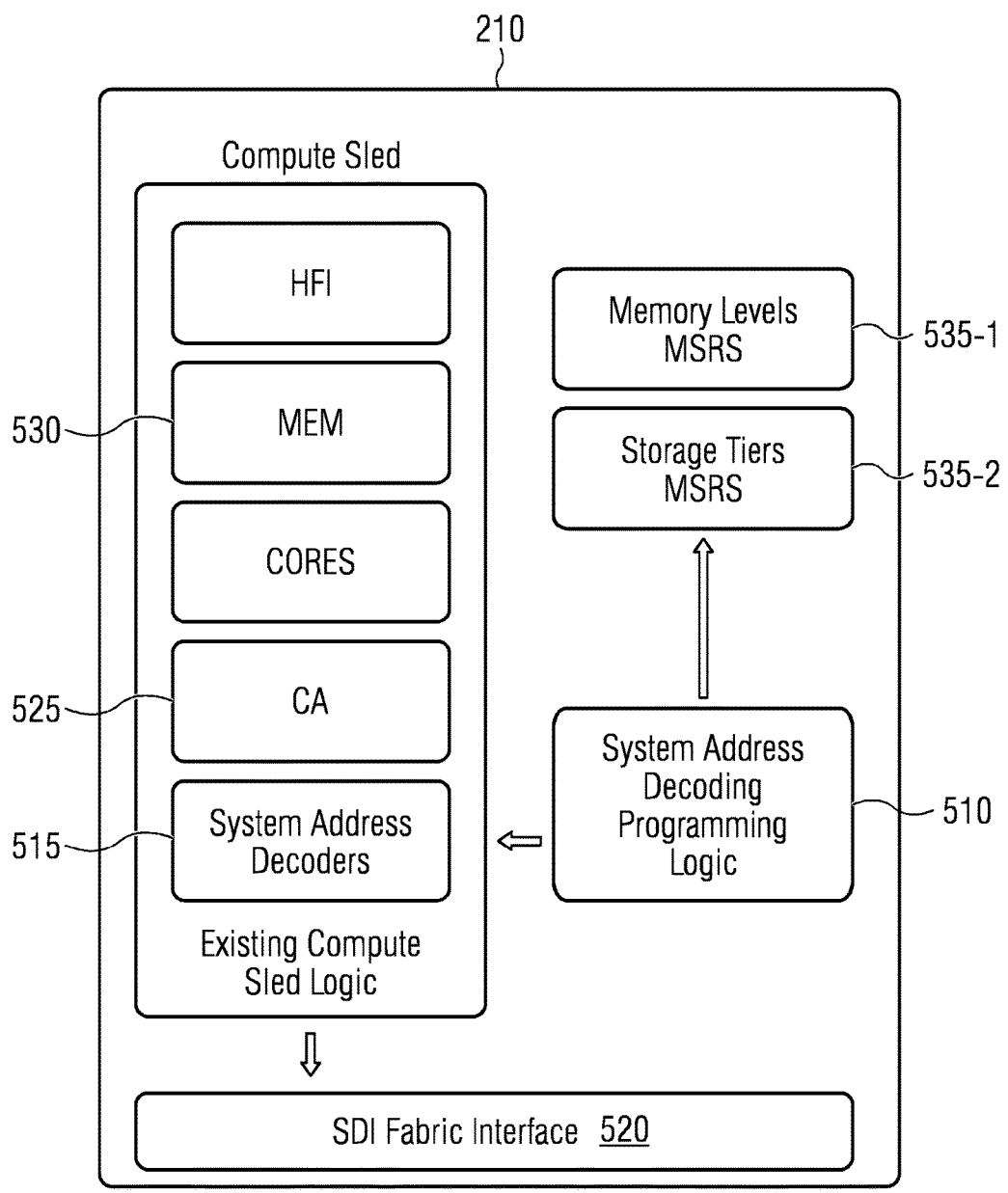
FIG. 5 shown a block diagram of an example compute sled.

As depicted in FIG. 5, the compute sled 210 can comprise a system address decoding programming logic 510 that can be used by the resource manager 150 in order to program system address decoders 515 to map the different memory and storage tiers to a corresponding SDI Fabric Interface 520 of the compute sled 210. Thus, Caching Agents (CA) 525 can be configured to redirect I/O and memory requests targeting each of the memory or storage tiers to remote disaggregated memory or storage devices 110 or to local memory or storage 530. Further, the compute sled 210 can comprise a set of control registers (e.g. Model Specific Registers, MSRs) 535 that can be configured by the resource manager 150 when the composite node 120 is composed to specify how many memory and storage tiers are available, their characteristics and memory ranges to where there are mapped. Thus, the resource manager 150 can be configured to specify the selected disaggregated computing hardware by writing to the control registers 535 of compute sled 210. Thereby, the set of control registers 535 is indicative of at least one of the groups of the number of memory or storage tiers, respective hardware characteristics, and respective memory/storage address ranges.

This can be used by the Operating System to properly show each memory and storage tier to the application. Application can use those control registers 535 to understand performance implications of each tier. In some examples, the platform can expose the following control registers 535-1 for k memory levels:

{MSR_MEM_1LM_BW, MSR_MEM_1LM_LAT, MSR_MEM_1LM_TECHOLOGY}
. . .
{MSR_MEM_kLM_BW, MSR_MEM_kLM_LAT, MSR_MEM_kLM_TECHOLOGY}

Here, register MSR_MEM_kLM_BW is used to indicate the memory bandwidth of memory level k. Register MSR_MEM_kLM_LAT is used to indicate the latency of memory level k. Register MSR_MEM_kLM_LAT is used to indicate the memory technology of memory level k.

In some examples, the platform can expose the following control registers 535-2 for k storage tiers:

{MSR_STO_1TIER_BW, MSR_STO_1TIER_LAT, MSR_STO_1TIER_TECHOLOGY}
. . .
{MSR_STO_kTIER_BW, MSR_STO_kTIER_LAT, MSR_STO_kTIER_TECHOLOGY}

Here, register MSR_STO_kTIER_BW is used to indicate the bandwidth of storage tier k. Register MSR_STO_kTIER_LAT is used to indicate the latency of storage tier k. Register MSR_STO_kTIER_TECHOLOGY is used to indicate the memory technology of storage tier k. The skilled person having benefit from the present disclosure will appreciate that the registers 535 are one of various alternatives to discover by OS or the application how the tiering is done. However, other methods such as discovering through the resource manager (SDI manager) 159 or querying to the orchestrator are conceivable as well.

Figure 6:
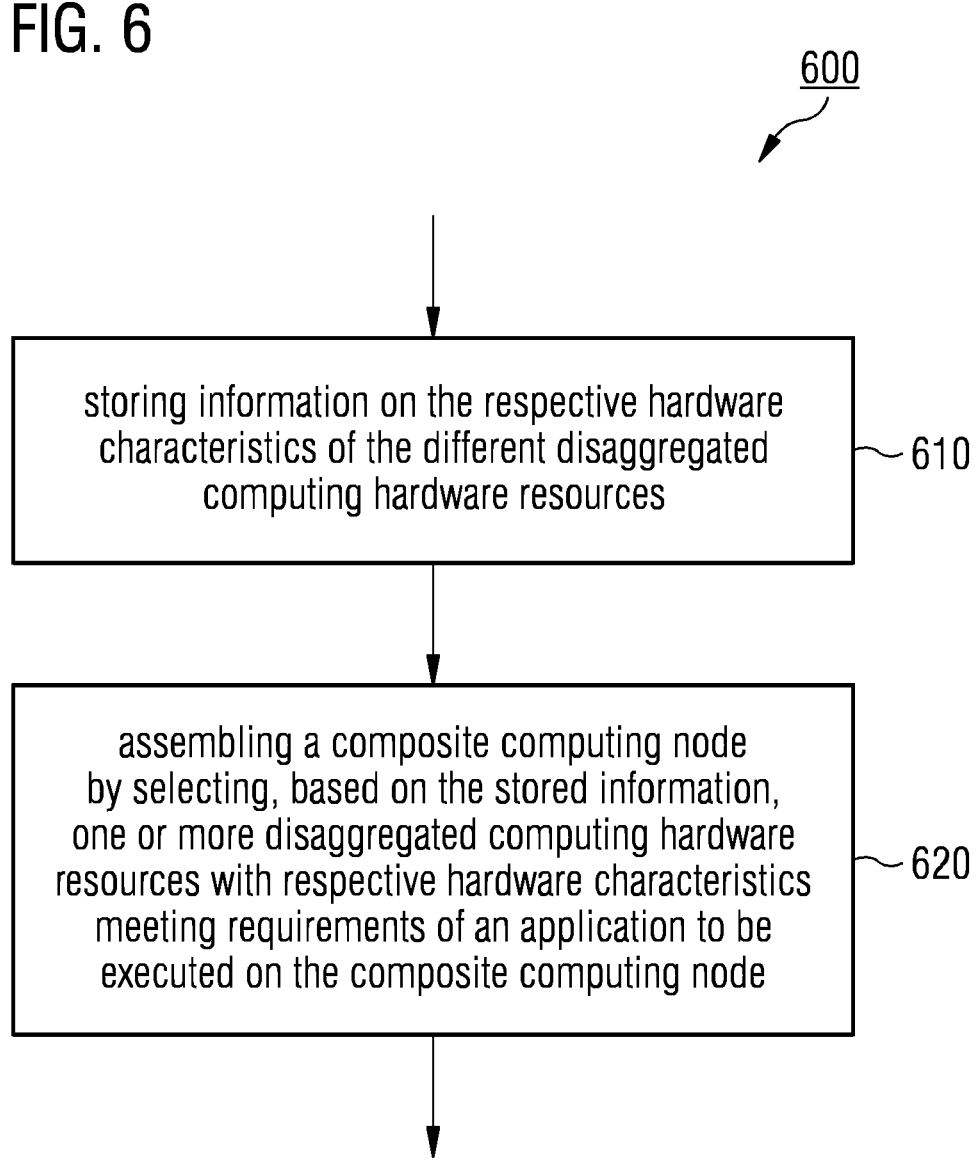
FIG. 6 shows a flow chart of a method for dynamically composing a computing system.

The skilled person having benefit from the present disclosure will appreciate that the apparatuses described before are configured to carry a method for dynamically composing a computing system based on a plurality of different disaggregated computing hardware resources 110 having respective hardware characteristics. An example of such a method 600 is illustrated in FIG. 6.

The method 600 includes storing 610 information on the respective hardware characteristics of the different disaggregated computing hardware resources 110 and assembling 620 a composite computing node 120 by selecting, based on the stored information, one or more disaggregated computing hardware resources 110 with respective hardware characteristics meeting requirements of an application to be executed on the composite computing node. As has been described before, the information on the respective hardware characteristics can be stored in the resource manager 150. In this way, the resource manager 150 can assemble a composite computing node 120 according to the hardware requirements of the application that is supposed to be executed on the composite computing node.

To summarize, the present disclosure provides functionalities to mitigate the complexity underlying the SDI storage and memory architecture. Some examples relate to performance and cost based adaptive memory and storage composition for composable architectures. The architecture provides access to multiple types of memory and storage disaggregated and local resources, each of them having different characteristics in terms of performance, capacity, cost and technologies (such as reliability, volatility etc.). The amounts of data tiers that can be considered from the application perspective are much larger than with traditional architectures. The possibilities to create a composite node satisfying memory and storage user requirements can be substantially large (multiple types of ways to create a composite node). To address the previous three areas this invention proposes an extension of existing resource managers in order to be able to provide generic features and methods to the software stack in order to efficiently use and map the storage and memory tiers and technologies offered by the SDI architecture while considering cost implications.

The present disclosure proposes a new data tiering model that allows the orchestrator to:

(1) dynamically define how many memory and storage tiers a given composite node will have; (2) associate each tier to a particular memory or storage device (local or disaggregated); (3) map to each tier a given memory or storage address range that can be used by the application to access to that particular tier.

(2) A resource selection algorithm implemented in the resource manager that allows selecting memory or storage based on performance, cost, capacity and technology. This algorithm is used to select the specific resource that will be associated to each of the tiers.

Figure 7:
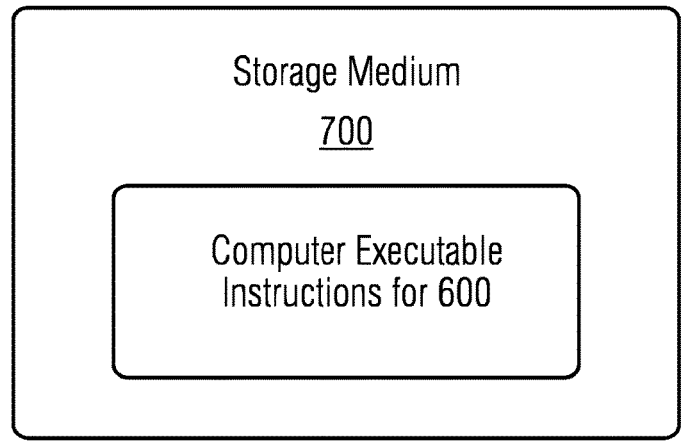
FIG. 7 illustrates an example of a storage medium.

FIG. 7 illustrates an example storage medium 700. As shown in FIG. 7, the storage medium includes a storage medium 700. The storage medium 700 may comprise an article of manufacture. In some examples, storage medium 700 may include any non-transitory computer readable medium or machine readable medium, such as an optical, magnetic or semiconductor storage. Storage medium 700 may store various types of computer executable instructions, such as instructions to implement logic flow 600. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 8:
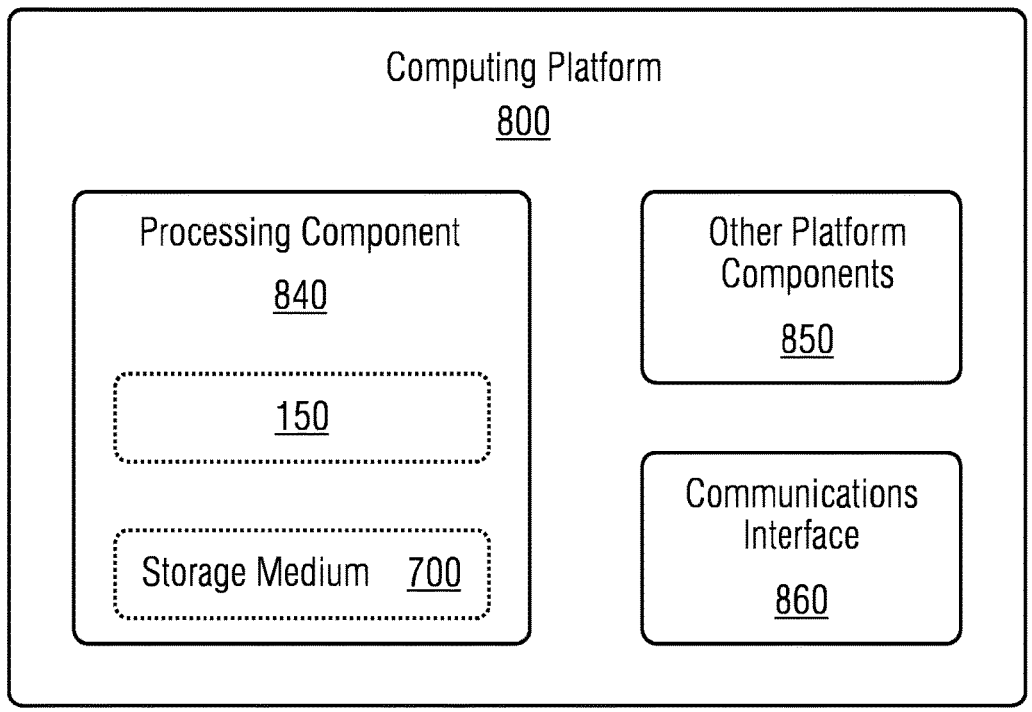
FIG. 8 illustrates an example of a computing platform.

FIG. 8 illustrates an example computing platform 800. In some examples, as shown in FIG. 8, computing platform 800 may include a processing component 840, other platform components 850 or a communications interface 860. According to some examples, computing platform 800 may host management elements (e.g., cloud infrastructure orchestrator, network data center service chain orchestrator, or the like) providing management functionality for a system having a shared pool of configurable computing resources such as system 100 of FIG. 1, for example. Computing platform 800 may either be a single physical server or a composed logical server that includes combinations of disaggregate components or elements composed from a shared pool of configurable computing resources.

According to some examples, processing component 840 may execute processing operations or logic for resource manager 150 and/or storage medium 700. Processing component 840 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 850 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAIVI), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 860 may include logic and/or features to support a communication interface. For these examples, communications interface 860 may include one or more communication interfaces that operate according to various communication protocols or standards to communicate over direct or network communication links. Direct communications may occur via use of communication protocols or standards described in one or more industry standards (including progenies and variants) such as those associated with the PCIe specification. Network communications may occur via use of communication protocols or standards such those described in one or more Ethernet standards promulgated by IEEE. For example, one such Ethernet standard may include IEEE 802.3. Network communication may also occur according to one or more OpenFlow specifications such as the OpenFlow Hardware Abstraction API Specification. Network communications may also occur according to the Infiniband Architecture specification or the TCP/IP protocol.

As mentioned above computing platform 800 may be implemented in a single server or a logical server made up of composed disaggregate components or elements for a shared pool of configurable computing resources. Accordingly, functions and/or specific configurations of computing platform 800 described herein, may be included or omitted in various embodiments of computing platform 800, as suitably desired for a physical or logical server.

The components and features of computing platform 800 may be implemented using any combination of discrete circuitry, application specific integrated circuits (ASICs), logic gates and/or single chip architectures. Further, the features of computing platform 1000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 800 shown in the block diagram of FIG. 8 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The following examples pertain to further embodiments.

Example 1 is a dynamically composable computing system comprising a computing fabric interconnecting a plurality of different disaggregated computing hardware resources having respective hardware characteristics. The dynamically composable computing system comprises a resource manager which has access to the respective hardware characteristics of the different disaggregated computing hardware resources and which is configured to assemble a composite computing node by selecting one or more disaggregated computing hardware resources with respective hardware characteristics meeting requirements of an application to be executed on the composite computing node. An orchestrator is configured to schedule the application using the assembled composite computing node.

In Example 2, the respective hardware characteristics can be from the group of processing performance, power consumption, bandwidth, latency, capacity, underlying technology, and cost.

In Example 3, the resource manager can comprise storage configured to store metadata indicative of the hardware characteristics associated with the plurality of different distributed disaggregated hardware resources.

In Example 4, the different distributed computing hardware resources can comprise different types of computer memory or storage.

In Example 5, the dynamically composable computing system of any one of the previous examples can further optionally comprise at least one compute sled including a set of local computing hardware resources. The resource manager can be configured to connect the compute sled to the selected disaggregated computing hardware resources through the computing fabric.

In Example 6, the local computing hardware resources of the compute sled of Example 5 can comprise one or more local CPUs and one or more local memory modules.

In Example 7, the compute sled of any one of Examples 5 or 6 can comprise a set of control registers. The resource manager can be configured to specify the selected disaggregated computing hardware by writing to the control registers.

In Example 8, the set of control registers of Example 7 can be indicative of at least one of the groups of the number of memory or storage tiers, respective characteristics, and respective address ranges.

In Example 9, the orchestrator of any one of the previous Examples can be configured to provide the application's requirements to the resource manager for assembling the composite computing node.

In Example 10, the orchestrator of any one of the previous Examples can be configured to determine, according to the application's requirements, a number of memory and/or storage tiers of the composite computing node, wherein different memory and/or storage tiers are associated with respective different hardware resource characteristics. The resource manager can be configured to associate one or more memory or storage hardware resources meeting the respective hardware resource characteristic with a respective memory or storage tier and map a respective address range to a respective memory or storage tier.

In Example 11, the resource manager of Example 10 can be configured to associate a memory or storage hardware resource with one of the memory or storage tiers only if its associated hardware resource characteristics fall within a predefined range for the respective tier.

In Example 12, the resource manager of Example 11 can be configured to associate a memory or storage hardware resource with one of the memory or storage tiers only if at least one of its associated processing performance, power consumption, bandwidth, latency, capacity, underlying technology, or cost falls within a predefined range for the respective tier.

In Example 13, a first one of the of memory or storage tiers of any one of Examples 10 to 12 can be associated with local memory or storage hardware resources of a compute sled and at least a second one of the of memory or storage tiers is associated with dynamically configured disaggregated computing memory or storage hardware resources.

In Example 14, the composite computing node can be configured to redirect storage or memory requests targeting one or more of the determined memory or storage tiers of any one of Examples 10 to 13 to one or more respective memory or storage hardware resources being associated with a respective memory or storage tier.

Example 15 is a data center comprising at least one compute sled including a set of local computing hardware resources, a computing fabric comprising a plurality of different disaggregated memory and storage hardware resources having respective hardware characteristics, an orchestrator configured to schedule an application having application specific hardware requirements, and a data center resource management hardware component having access to the respective hardware characteristics of the different disaggregated memory and storage hardware resources and configured to assemble a composite computing node by selecting one or more disaggregated memory and storage hardware resources with respective hardware characteristics meeting the application's hardware requirements and connecting the statically configured compute sled to the selected disaggregated memory and storage hardware resources through the computing fabric.

In Example 16, the data center resource management hardware component of Example 15 can comprises storage, which is accessible by the orchestrator, for storing metadata indicative of the respective hardware characteristics associated with the plurality of different disaggregated memory and storage hardware resources available in the data center.

In Example 17, the compute sled of any one of Examples 15 or 16 can comprise a set of control registers. The data center resource management hardware component can be configured to specify the selected disaggregated memory and storage hardware resources by writing to the control registers.

Example 17 is a method for dynamically composing a computing system based on a plurality of different disaggregated computing hardware resources having respective hardware characteristics. The method comprises storing information on the respective hardware characteristics of the different disaggregated computing hardware resources and assembling a composite computing node by selecting, based on the stored information, one or more disaggregated computing hardware resources with respective hardware characteristics meeting requirements of an application to be executed on the composite computing node.

In Example 19, respective hardware characteristics of Example 18 can be from the group of processing performance, power, bandwidth, latency, capacity, underlying technology, and cost.

In Example 20, the different distributed computing hardware resources of any one of Examples 18 or 19 can comprise different types of computer memory or storage.

In Example 21, assembling the composite computing node can further comprise connecting a compute sled with a set of local computing hardware resources to the selected disaggregated computing hardware resources through the computing fabric.

In Example 22, the local computing hardware resources of the compute sled of Example 21 can comprise one or more local CPUs and one or more local memory modules.

In Example 23, assembling the composite computing node can further comprise writing the respective hardware characteristics of the selected disaggregated computing hardware to one or more control registers of the compute sled of any one of Example 21 or 22.

In Example 24, the one or more control registers of Example 23 can be indicative of at least one of the groups of a number of memory or storage tiers, respective characteristics, and respective address ranges.

In Example 25, the method of any one of Example 18 to 24 can optionally further include providing the application's requirements from an orchestrator for scheduling the application to the resource manager for assembling the composite computing node.

In Example 26, the method of any one of Example 18 to 25 can optionally further include determining, according to the application's requirements, a number of memory or storage tiers of the composite computing node, wherein different memory or storage tiers are associated with respective different hardware resource characteristics, associating one or more memory or storage hardware resources meeting the respective hardware resource characteristic with a respective memory or storage tier, and mapping a respective address range to a respective memory or storage tier.

In Example 27, a memory or storage hardware resource is associated with one of the memory or storage tiers of Example 26 only if its associated hardware resource characteristics fall within a predefined range for the respective tier.

In Example 28, a memory or storage hardware resource can be associated with one of the memory or storage tiers of Example 26 or 27 only if at least one of its associated power consumption, bandwidth, latency, capacity, underlying technology, or cost falls within a predefined range for the respective tier.

In Example 29, a first one of the of memory or storage tiers of any one of Examples 26 to 28 can be associated with local memory or storage hardware resources of a compute sled and at least a second one of the of memory or storage tiers can be associated with disaggregated computing memory or storage hardware resources.

In Example 30, the method of any one of Examples 26 to 29 can optionally further include redirecting storage or memory requests targeting one or more of the determined memory or storage tiers to one or more respective memory or storage hardware resources being associated with a respective memory or storage tier.

Example 31 is a computer program product comprising a non-transitory computer readable medium having computer readable program code embodied therein, wherein the computer readable program code, when being loaded on a computer, a processor, or a programmable hardware component, is configured to implement a method for dynamically composing a computing system based on a plurality of different disaggregated computing hardware resources having respective hardware characteristics, the method comprising storing information on the respective hardware characteristics of the different disaggregated computing hardware resources and assembling a composite computing node by selecting, based on the stored information, one or more disaggregated computing hardware resources with respective hardware characteristics meeting requirements of an application to be executed on the composite computing node.

What is claimed is:
1. A system, comprising:
 a computing fabric including a plurality of different disaggregated computing hardware resources having respective hardware characteristics;

a resource manager having access to the respective hardware characteristics of the different disaggregated computing hardware resources and configured to assemble a composite computing node by selecting one or more disaggregated computing hardware resources with respective hardware characteristics meeting requirements of an application to he executed on the composite computing node; and an orchestrator configured to schedule the application using the assembled composite computing node, wherein the orchestrator is configured to determine, according to the requirements of the application, a number of memory and/or storage tiers of the composite computing node, wherein different memory and/or storage tiers are associated with respective different hardware resource characteristics, and wherein the resource manager is configured to associate one or more memory or storage hardware resources meeting the respective hardware resource characteristic with a respective memory or storage tier and map a respective address range to a respective memory or storage tier.

2. The system of claim 1, wherein respective hardware characteristics comprise processing performance, power consumption, bandwidth, latency, capacity, underlying technology, or cost.

3. The system of claim 1, wherein the resource manager includes storage configured to store metadata indicative of the hardware characteristics associated with the plurality of different distributed disaggregated hardware resources.

4. The system of claim 1, wherein the different distributed computing hardware resources comprise different types of computer memory or storage.

5. The system of claim 1, further comprising
at least one compute sled including a set of local computing hardware resources,
wherein the resource manager is configured to connect the compute sled to the selected disaggregated computing hardware resources through the computing fabric.

6. The system of claim 5, wherein the local computing hardware resources of the compute sled comprise one or more local CPUs and one or more local memory modules.

7. The system of claim 5, wherein the compute sled includes a set of control registers and wherein the resource manager is configured to specify the selected disaggregated computing hardware by writing to the control registers.

8. The system of claim 7, wherein the set of control registers is indicative of at least one of a number of memory or storage tiers, respective characteristics, and respective address ranges.

9. The system of claim 1, wherein the orchestrator is configured to provide the application's requirements to the resource manager for assembling the composite computing node.

10. The system of claim 1, wherein the resource manager is configured to associate a memory or storage hardware resource with one of the memory or storage tiers only if its associated hardware resource characteristics fall within a predefined range for the respective tier.

11. The system of claim 10, wherein the resource manager is configured to associate a memory or storage hardware resource with one of the memory or storage tiers only if at least one of its associated processing performance, power consumption, bandwidth, latency, capacity, underlying technology, or cost falls within a predefined range for the respective tier.

12. The system of claim 1, wherein a first one of the of memory or storage tiers is associated with local memory or storage hardware resources of a compute sled and at least a second one of the of memory or storage tiers is associated with dynamically configured disaggregated computing memory or storage hardware resources.

13. The system of claim 1, wherein the composite computing node is configured to redirect storage or memory requests targeting one or more of the determined memory or storage tiers to one or more respective memory or storage hardware resources being associated with a respective memory or storage tier.

14. A data center, comprising:
at least one compute sled including a set of local computing hardware resources;
a computing fabric including a plurality of different disaggregated memory and storage hardware resources having respective hardware characteristics;
an orchestrator configured to schedule an application having application specific hardware requirements; and
a data center resource management hardware component having access to the respective hardware characteristics of the different disaggregated memory and storage hardware resources and configured to assemble a composite computing node by selecting one or more disaggregated memory and storage hardware resources with respective hardware characteristics meeting the application's hardware requirements and connecting the compute sled to the selected disaggregated memory and storage hardware resources through the computing fabric,
wherein the orchestrator is configured to determine, according to the application specific hardware requirements, a number of memory and/or storage tiers of the composite computing node, wherein different memory and/or storage tiers are associated with respective different hardware characteristics, and wherein the data center resource management hardware component is configured to associate one or more memory or storage hardware resources meeting the respective hardware characteristic with a respective memory or storage tier and map a respective address range to a respective memory or storage tier.

15. The data center of claim 14, wherein the data center resource management hardware component includes storage, which is accessible by the orchestrator, for storing metadata indicative of the respective hardware characteristics associated with the plurality of different disaggregated memory and storage hardware resources available in the data center.

16. The data center of claim 14, wherein the compute sled includes a set of control registers and wherein the data center resource management hardware component is configured to specify the selected disaggregated memory and storage hardware resources by writing to the control registers.

17. A method comprising:
composing a computing system based on a plurality of different disaggregated computing hardware resources having respective hardware characteristics, composing the computing system to include:
storing information on the respective hardware characteristics of the different disaggregated computing hardware resources;
assembling a composite computing node by selecting, based on the stored information, one or more disaggregated computing hardware resources with respective hardware characteristics meeting requirements of an application to be executed on the composite computing node;

determining, according to the requirements of the application, a number of memory and/or storage tiers of the composite computing node, wherein different memory and/or storage tiers are associated with respective different hardware resource characteristics; and associating one or more memory or storage hardware resources meeting the respective hardware resource characteristic with a respective memory or storage tier and mapping a respective address range to a respective memory or storage tier.

18. The method of claim 17, wherein respective hardware characteristics comprise processing performance, power, bandwidth, latency, capacity, underlying technology, or cost.

19. The method of claim 17, wherein the different distributed computing hardware resources comprise different types of computer memory or storage.

20. The method of claim 17, wherein assembling the composite computing node further comprises connecting a compute sled with a set of local computing hardware resources to the selected disaggregated computing hardware resources through the, computing fabric.

21. The method of claim 20, wherein the local computing hardware resources of the compute sled comprise one or more local CPUs and one or more local memory modules.

22. The method of claim 20, wherein assembling the composite computing node further comprises writing the respective hardware characteristics of the selected disaggregated computing hardware to one or more control registers of the compute sled.

23. The method of claim 22, wherein the one or more control registers are indicative of at least one of the groups of a number of memory or storage tiers, respective characteristics, and respective address ranges.

24. The method of claim 17, further comprising providing the application's requirements from an orchestrator for scheduling the application to the resource manager for assembling the composite computing node.

* * * * *